US009064047B2

(12) United States Patent
Agarwal et al.

(10) Patent No.: US 9,064,047 B2
(45) Date of Patent: Jun. 23, 2015

(54) PARALLEL PROCESSING OF ETL JOBS INVOLVING EXTENSIBLE MARKUP LANGUAGE DOCUMENTS

(75) Inventors: Manoj K. Agarwal, Noida (IN); Manish A. Bhide, Vasant Kunj (IN); Srilakshmi Kotwal, Hyderabad AP (IN); Srinivas Kiran Mittapalli, Secunderabad (IN); Sriram Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/566,255

(22) Filed: Sep. 24, 2009

(65) Prior Publication Data

US 2011/0072319 A1    Mar. 24, 2011

(51) Int. Cl.
G06F 17/00 (2006.01)
G06F 11/36 (2006.01)
G06F 17/30 (2006.01)

(52) U.S. Cl.
CPC ...... *G06F 11/3604* (2013.01); *G06F 17/30917* (2013.01)

(58) Field of Classification Search
USPC ............................ 707/999.104, 102, 867, 713
See application file for complete search history.

(56) References Cited

U.S. PATENT DOCUMENTS 7,139,779 B1 * 11/2006 Kornelson et al. ............... 1/1
7,451,392 B1 * 11/2008 Chalecki et al. ............. 715/234
7,523,131 B2 * 4/2009 Warner et al. ................... 1/1
2004/0046803 A1 * 3/2004 James ......................... 345/810
2004/0267813 A1 * 12/2004 Rivers-Moore et al. ... 707/104.1
2005/0120160 A1 * 6/2005 Plouffe et al. ................ 711/1
2005/0187974 A1 * 8/2005 Gong ........................ 707/104.1
2006/0036657 A1 * 2/2006 Cheslow ..................... 707/204
2006/0085489 A1 * 4/2006 Tomic et al. ................. 707/200
2006/0184552 A1 * 8/2006 Meliksetian et al. ......... 707/101
2007/0078877 A1 * 4/2007 Ungar et al. ................. 707/101
2008/0033974 A1   2/2008 Cameron
2008/0091714 A1 * 4/2008 Idicula et al. ............ 707/103 R
2008/0235260 A1 * 9/2008 Han et al. .................... 707/102
2009/0327255 A1 * 12/2009 Larson et al. ................... 707/4

OTHER PUBLICATIONS

Lu et al., A parallel approach to XML parsing.
Wu et al., A Hybrid Parallel Processing for XML Parsing and Schema Validation.

(Continued)

*Primary Examiner* — Hosain Alam
*Assistant Examiner* — Eliyah S Harper
(74) *Attorney, Agent, or Firm* — Ryan, Mason & Lewis, LLP

(57) ABSTRACT

Techniques for running an Extract Transform Load (ETL) job in parallel on one or more processors wherein the ETL job comprises use of an extensible markup language (XML) document are provided. The techniques include receiving an XML document input, identifying a node in the XML document at which partitioning of the XML document is to begin, sending partition information to each respective processor, performing a shallow parsing of the XML document in parallel on the one or more processors, wherein each processor performs shallow parsing using the identified partition node until it reaches its identified partition, using the shallow parsing to generate the partition of the input XML document, wherein each processor generates a different partition of the same XML document, and sending each partition in streaming format to an ETL job instance.

17 Claims, 6 Drawing Sheets

(56) References Cited

OTHER PUBLICATIONS

Pan et al., A Static Load Balancing Scheme for Parallel XML Parsing on Multicore CPUs.
Head et al., Parallel Processing of Large Scale XML-Based Application Documents on Multi-Core Architectures with PiXiMal.
Lu et al., ParaXML: A Parallel XML Processing Model on the Multi-Core CPUs, pp. 1-35.
Kurita et al., Efficient Query Processing for Large XML Data in Distributed Environment, 21st International Conference on Advanced Networking and Applications (AINA'07).
Wu et al., A Hybrid Parallel Processing for XML Parsing and Schema Validation, 2008.
Head et al., Parallel Processing of Large Scale XML-Based Application Documents on Multi-Core Architectures with PiXiMal, 2008.
Kurita et al., Efficient Query Processing for Large XML Data in Distributed Environment, 21st International Conference on Advanced Networking and Applications (AINA'07), 2007.
Lu et al. A Parallel Approach to XML Parsing, Grid '06 Proceedings of the 7th IEEE/ACM International Conference on Grid Computing, pp. 223-230, 2006.
Pan et al. A Static Load Balancing Scheme for Parallel XML Parsing on Multicore CPUs, Seventh IEEE International Symposium on Cluster Computing and the Grid, pp. 351-362, May 2007.
Lu et al. ParaXML: A Parallel XML Processing Model on the Multi-Core CPUs, (ParaXML) Technical Report TR662, Apr. 2008.

\* cited by examiner

PARALLEL PROCESSING OF ETL JOBS INVOLVING EXTENSIBLE MARKUP LANGUAGE DOCUMENTS

FIELD OF THE INVENTION

Embodiments of the invention generally relate to information technology, and, more particularly, to shredding and schema validation.

BACKGROUND OF THE INVENTION

The size of the extensible markup language (XML) documents used in to applications is growing and XML files sizes ranging in gigabytes (GBs) are fairly common. This includes data integration where source administrators and external providers can generate large XML file sets in order to isolate and batch the processing of data. Wide availability of multi-core processors presents a natural setting to process these large XML files in parallel.

Parallelism can be achieved via pipeline parallelism and partitioned parallelism. Pipeline parallelism occurs when different operators of an ETL (Extract Transform Load) job are working on different parts of an XML stream simultaneously. This parallelism is a natural technique whenever there are multiple operators (in an ETL job) operating on a XML document stream in a serial manner. Partition parallelism can be achieved when multiple instances of the same operator of an ETL job are working on different parts of an XML stream simultaneously. Each instance of the operator can run on a different processor. However, due to the hierarchical structure of XML, processing XML in parallel by partitioning is inherently a complex task.

Additionally, shredding of large XML documents (which is one of the key operations of an ETL job) is a very slow and expensive operation. XML shredding is the process of relationalizing XML documents, or, for example, taking data from XML documents and storing them in a relational database. Many existing approaches and/or products cannot scale to such large input data, and shredding of large documents is inherently a serial task. Schema validation of such large documents adds to the cost of shredding, and shredding is typically the first step in an ETL job (wherein large documents thereby affect the entire ETL process).

Existing approaches do not provide techniques that enable the shredding and schema validation process to run in parallel. Existing approaches also do not provide modified ETL job definition at job design time or speed-up over serial execution.

SUMMARY OF THE INVENTION

Principles and embodiments of the invention provide parallelization techniques to for running ETL jobs which use extensible markup language document(s) as input. An exemplary method (which may be computer-implemented) for running an Extract Transform Load (ETL) job in parallel on one or more processors wherein the ETL job comprises use of an extensible markup language (XML) document, according to one aspect of the invention, can include steps of receiving an XML document input, identifying a node in the XML document at which partitioning of the XML document is to begin, sending partition information to each respective processor, performing a shallow parsing of the XML document in parallel on the one or more processors, wherein each processor performs shallow parsing using the identified partition node until it reaches its identified partition, using the shallow parsing to generate the partition of the input XML document, wherein each processor generates a different partition of the same XML document, and sending each partition in streaming format to an ETL job instance.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include techniques for optimized ETL (Extract Transform Load) job processing which uses XML data as input. The ETL jobs could include a step for XML document shredding and schema validation. Given an XML document, one or more embodiments of the invention include enabling running an ETL job on one or more XML documents in parallel on multiple nodes. The ETL job could include schema validation of the XML document which can also be done on multiple nodes using the techniques described herein. Additionally, one or more embodiments of the invention include using horizontal and vertical partitioning on different portions of an XML document. Horizontal partitioning involves creating partitions with identical schema (which can be used, for example, for shredding purposes). Vertical partitioning, by way of example, can be used for optimized XML schema validation.

As detailed herein, an ETL job can receive input in the form of a set of XML path languages (XPaths) mapping to a set of output relational attributes. One or more embodiments of the invention can take the definition of the ETL process and generate output in the form of a modified ETL job definition which can run on multiple processors in parallel which could include a modified set of XPaths mapping to a set of output relational attributes. The ETL job could also have a step for XML schema validation which takes as input an XML scheme file definition. For such an ETL job, the techniques detailed herein can produce a set of modified XML schema files for each processor on which the ETL job is to execute.

In one or more embodiments of the invention, for parallel execution of an ETL job that involves XML document shredding, horizontal partitioning can be used to shred different parts of an XML document in parallel on different processors. By way of example, input can be received from a job designer about the XML node at which partitioning is to be done (for example, partitioning can be done at W node, as given in FIG. 1), and input can also be received from a user on the approximate size of each partition (for example, a user states that each partition can be of maximum 1 GB size).

Figure 1:
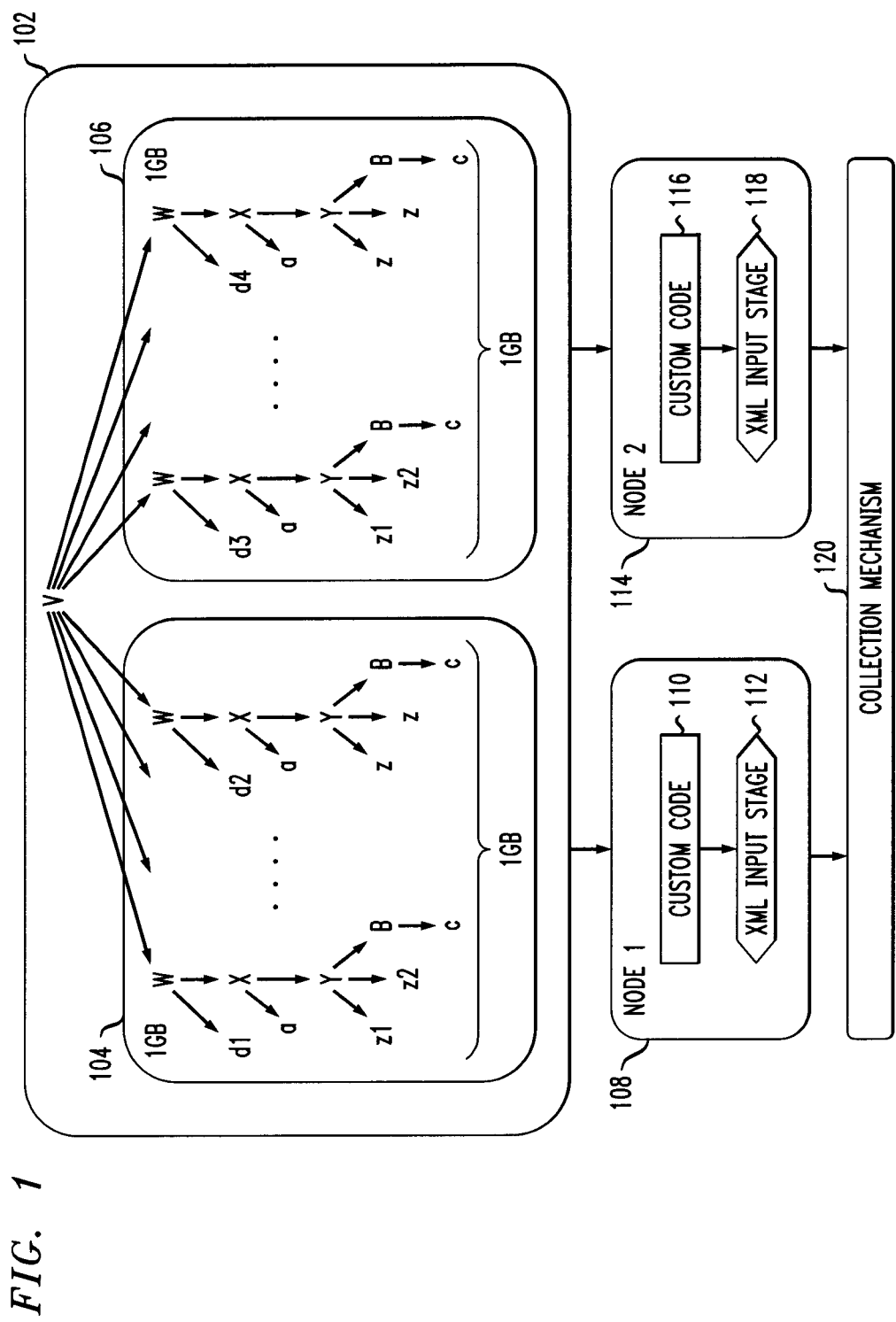
FIG. 1 is a diagram illustrating an example of the techniques described herein running on two nodes, according to an embodiment of the present invention.

One or more embodiments of the invention include code that reads different parts of an XML document and feeds it in streaming format to an instance of an ETL job (which could include an XML shredder). FIG. 1 is a diagram illustrating an example of the techniques described herein running on two nodes, according to an embodiment of the present invention. By way of illustration, in FIG. 1, component 102 depicts the XML document input to an ETL job. By way of example, let the size of this XML document be 2 GB.

FIG. 1 depicts how the job can be executed on two different processors (Node 1 (component 108) and Node 2 (component 114)) where each node processes (different) 1 GB of XML document. The first processor executes the ETL job on the first GB (labeled as 104 in FIG. 1) of the XML document. The second processor, on the other hand, processes the second GB of the XML document (labeled as 106 in FIG. 1). The custom code 116 on the 2nd node (and 110 on the first node) can perform a shallow parsing of the document using the /V/W node until it reaches the beginning of the 2nd GB. The custom code 116 can then start passing the XML document beyond the end of 1 GB as a separate XML document in streaming format to the ETL job instance running on the second processor. The ETL job is represented by 112 on node 1 (processor 1) and 118 on node 2 (processor 2).

An exemplary shallow parsing, according to one or more embodiments of the invention, on W node for the XML document 102 given in FIG. 1 can include the following. A search can be conducted for the following tags in the XML document: "<W>" "</W>" "<! [CDATA [" "]]>." As soon as a W tag is found, it is added to a stack. Also, when </W> is found, W is popped from the stack. If CDATA is found, it is pushed to a stack and nothing else is to be pushed until "]]>" is found. When "]]>" is found, CDATA is popped from the stack. Additionally, on ith node, when shallow parsing reaches ith GB, one can wait until the stack is empty. When empty, one can start sending the XML document from next "W" node as a stream to InputStage. Further, a dummy root node (named V) can be added before "W" node, and when shallow parsing reaches (i+1)th GB, one can wait until the stack is empty and then close the dummy root </V>.

One or more embodiments of the invention also include partitioning at an arbitrary node. By way of example, a user can suggest partitioning at nodes other than that below root (for example, a user could suggest partitioning at "X" node in 102 of FIG. 1). As detailed herein, shallow parsing can keep track of the last encountered "D" node value (in 102 of FIG. 1), and when a new document is sent to the ETL job instance in streaming format, it adds the "D" node below X node (for example, one can also change the XPaths provided to the ETL job definition to handle this change).

The techniques described herein also include handling of an XML document which has multiple children of a root node. By way of example, a root node can have multiple children, which could be used as output nodes for an ETL job which involves shredding step. Shallow parsing can find the first value of all output nodes not in the sub-tree rooted at the second step in the repetition path and add them to the stream.

Figure 2:
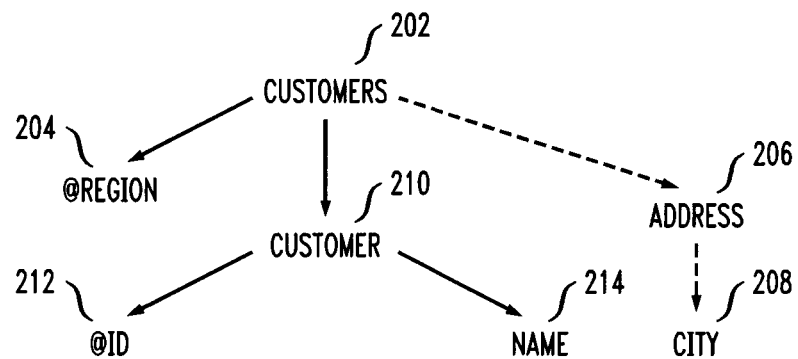
FIG. 2 is a diagram illustrating handling multiple children of a root node, according to an embodiment of the present invention.

FIG. 2 is a diagram illustrating handling multiple children of a root node, according to an embodiment of the present invention. By way of illustration, FIG. 2 depicts nodes including customers 202, @region 204, address 206, city 208, customer 210, @id 212 and name 214. For the example XML document schema given in FIG. 2, the nodes customers\@region and customers\address\city are output nodes below the root. For this example, the @region attribute can be added to a dummy root on all processors on which the ETL job is to be run, and a \customers\address[1]\city[1] node can be added under the dummy root.

As also detailed herein, one or more embodiments of the invention include partitioned parallelism. Partition parallelism can be achieved by partitioning the incoming XML document stream into several sub-streams, where each sub stream is further processed by a different processor. Because XML is hierarchical in structure, to partition XML is non-trivial. In order to achieve an efficient parallelism, each partition should be processed independently and should not have any dependence on any part of the XML document that is not part of that partition. If such a dependency exists, it would require communication between the processors, or alternatively, copies of the same data would have to be made available for multiple processors, which in turn would reduce the effectiveness of the parallel algorithm.

Figure 3:
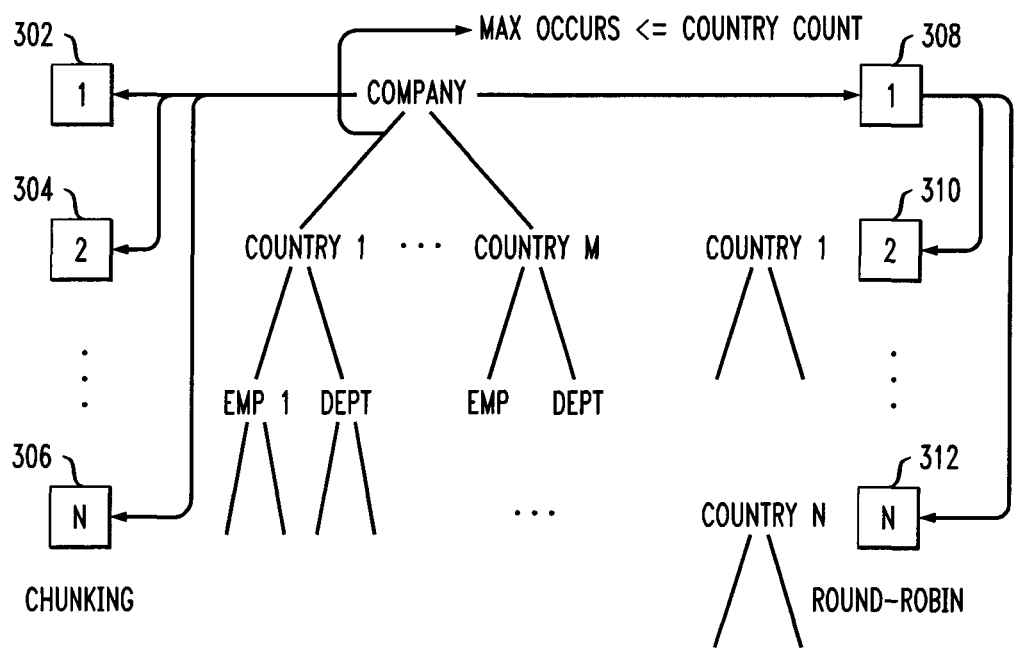
FIG. 3 is a diagram illustrating parallel schema validation, according to an embodiment of the present invention.

By way of example, consider the following example given in FIG. 3. FIG. 3 is a diagram illustrating parallel schema validation, according to an embodiment of the present invention. By way of illustration, FIG. 3 depicts two schemes (chunking and round robin) to validate XML schema in parallel, and includes processor 1 (component 302), processor 2 (component 304) and processor N (component 306), as well as processor 1 (component 308), processor 2 (component 310) and processor N (component 312).

As described herein, when an XML document stream is partitioned into several sub-streams, one or more embodiments of the invention validate XML schema for each of these independent XML sub-streams in parallel. The XML schema is a rich format and describes the semantic constraints on entire XML document. If the document is partitioned, the XML schema also needs to be redefined such that the redefined schema for each sub-stream is applicable on that sub-stream and, at the same time, the original input schema is applicable on the final merged result. The input schema may be partition safe, that is, if an XML stream is divided in several sub-streams, the original input schema is applicable on all the sub-streams as it is. This is referred to as stateless schema.

However, there may be certain schema indicators whose presence may make the input schema invalid for sub-streams in its original form. As such, schema needs to be redefined for each sub-stream. These are referred to herein as stateful schema. One or more embodiments of the invention also include redefining such stateful schema for sub-streams. Additionally, the techniques detailed herein can include modifying the schema definition file only for partition nodes decided by the partition algorithm for an operator. As such, the rest of the schema remains applicable as it is on XML sub-streams. Hence, a major part of schema remains untouched.

One can first find the presence of all such constraints that are applicable on entire XML document as a whole for each partition node and hence not applicable on partitioned XML document or XML sub-streams. In re-defined schemas for sub-streams, one or more embodiments of the invention include removing these schema impositions, with the remaining schema left as such. This stripped-down schema can then be applied to each of sub-streams. However, the original schema should still be applicable on the final merged results after processing.

As described herein, one or more embodiments of the invention include techniques for XML schema validation for stateful schemas. By way of example, one or more embodiments of the invention include dividing the schema validation process into two steps. Because the stripped down schema is valid for all of the sub-streams sans the constraint on the partitioned nodes, all of the down stream parsers are required to perform regular parsing and schema validation for this stripped-down schema against their respective XML document sub-stream. For the partitioned nodes, there will be a shallow parser that will perform parsing only for the partitioned links for the entire incoming XML document. Also, because the removed constraints are applicable only for partitioned nodes, the schema validation is also done during the partitioning process itself. As such, shallow parsing also performs schema validation for partition nodes along with partitioning the XML document.

Cumulative time for parsing the entire XML document is unchanged because no path in the XML document tree is parsed more than once, though a large part of it has been parallelized using shallow parsing techniques. Also, because shallow parsing is very light weight parsing, its overhead is minimal in terms of performance. Additionally, as described herein, parallel schema validation can be implemented in different ways corresponding to multiple XML partitioning techniques.

For example (and as depicted in FIG. 3), in a round-robin scheme, an explicit upstream node is receiving the incoming un-partitioned XML stream and shallow parsing the entire incoming stream, and then distributing the sub-streams to multiple parallel nodes. It also performs schema validation for all partition nodes. In a chunking scheme, each parallel node is receiving an entire stream where they skip the parts of the XML stream which they do not parse. Here, the last node has to scan the entire XML document (first to skip the document from the beginning using shallow parsing and then to process till the end). Because it starts shallow parsing from the beginning of XML document, it also performs the schema validation while skipping during shallow parsing.

With respect to FIG. 3, let this document be input to an ETL job which involves a join operator such that it joins the data present in /Company/Country/Emp with the data present in /Company/Country/Dept. If this XML document is partitioned (in a two-way partition scenario) such that all /Company/Country/Dept nodes go to the ETL job instance on processor 1, and all /Company/Country/Emp nodes go to the ETL job instance on processor 2. If such a partition is employed, no parallelism is achieved because the join operation between the /Company/Country/Dept and /Company/Country/Emp cannot be completed simultaneously on both processors since it requires access to both /Company/Country/Dept and /Company/Country/Emp data of the XML document.

However, if the same partition is applied at the /Company/Country level, the entire information needed by the operator to perform a join will be available at a single node. If each processor has the complete sub-tree rooted at /Company/Country then significant performance improvement can be achieved. Using the shallow parsing technique, for this XML document given in FIG. 3, one would perform the shallow parsing on the /Company/Country node and send the first part of the XML document to the first processor and the second part of the XML document to the second processor.

As also detailed herein, one or more embodiments of the invention include partitioning XML for load balancing, that is, partitioning the XML document to keep the overall load on all parallel processors as evenly distributed as possible to achieve maximum performance gains. Also, one or more embodiments of the invention distribute the XML partitions evenly in a single pass manner (that is, does not need to parse the XML document first to understand its statistical properties for even partitioning). For the input un-partitioned XML document, multiple strategies can be adopted, as described herein, to achieve even distribution of load in a single pass.

In one strategy, for example, one processor does a shallow parsing of the un-partitioned XML document and distributes the partitioned XML segments in round-robin manner to each parallel processor. In a round-robin scheme, the sub-tree rooted at the to first occurrence of the partition node is sent to a first processor and the sub-tree rooted at the second occurrence of the partition node is sent to a second processor and so on. If the load is distributed in this manner, even if the sub-tree sizes rooted at each partition nodes are highly uneven, each nodes get roughly the same amount of XML data as long as the number of instances of each partition node type are larger than number of parallel processors (which is almost always the case for large XML documents).

In another strategy (also referred to herein as a chunking scheme), for example, a seek-based solution can be employed where a processor seeks an appropriate position in XML document and starts parsing from that point onwards until it reaches the end of the chunk allocated to it. If S is the size of the XML document, each node approximately process S/N of XML data, where N is the total number of parallel processors.

Because XML is hierarchical in structure, a processor cannot seek directly to a location in the XML document, as it may end up in the middle of nested XML elements, or worse, in the middle of a CDATA section which is supposed to be ignored. As such, to achieve this strategy, each node starts shallow parsing from the start of the XML document, and continues until it reaches the beginning of its XML partition which is to be parsed. Once it reaches its correct parsing location, it will start processing the XML until it reaches the end of the partition assigned to it.

Though shallow parsing is very light weight parsing, it still incurs some overhead. If one numbers of available processors from 1 to N, later processors have to shallow-parse progressively more chunk of XML data (to reach their right location for processing). To alleviate this, one can progressively reduce the size of the partitions which are to be parsed by later nodes such that overall execution time is almost the same for each processing node to achieve maximum parallelization.

Additionally, one or more embodiments of the invention include computing the size of the partition which processor should process. In terms of notation, assume the size of XML document to be parsed is S and number of processors are N.

Also, the total time to completely process the XML document is $t_t$ and the time needed to shallow parse the entire document is $t_s$. By definition, $t_t > t_s$.

Suppose each node processes a chunk of size $S_i$; $1 \leq i \leq N$.

$$\Sigma_{1 \leq i \leq N} S_i \geq S \qquad (1)$$

The summation will be marginally greater than S because each node will receive root node. Because a goal is for each node to finish its shallow parsing and processing at the same time, one would want to satisfy the following system of equations:

$$0 + t_t S_1 = t_s S_1 + t_t S_2 \qquad (2)$$
$$= t_s(S_1 + S_2) + t_t S_3$$
$$= \ldots$$
$$= t_s \left( \sum_{1 \leq i \leq N-1} S_i \right) + t_t S_N$$

In this system of equations, the first term signifies the time spent by each processor in shallow parsing, whereas second term is the actual time spent in processing the job. The denominator S has been removed, as it is common for all equations.

By substituting, one can get the following solution for this system of equations:

$$S_i = \left( \frac{t_t}{t_t - t_s} \right)^{N-i} \left( \frac{t_t S_1 - t_s S}{t_t - t_s} \right); \ 1 < i \leq N \qquad (3)$$

One can put these $S_i$ values into equation (1) to get the chunk size to be processed by each parallel processing node. It can be checked from equation (2) that $t_t S_1 > t_s S$.

From equation (3), to get chunk sizes, one needs to know the ratio $t_s/t_t$. Underestimating this ratio will give some performance improvement, though may not be up to the extent if this ratio is accurately known. On the other hand if overestimated, the performance deteriorates as one node would be processing larger chunk compared to its rightful size, and hence reducing parallelism advantages. As such, the time spent in shallow parsing is preferably proportional to the number of partition nodes and inversely proportional to number of operators in a job definition.

By way of example, consider the following. If the original XML document is 4 GB in size and there are four nodes that process that document in parallel, one can either configure each node to work on its partition of XML (which is approximately 1 GB in size) or each node to works on (i mod 4)th partition node in a round robin manner. However, when it is said that each node is processing 1 GB, it may not be exactly 1 GB, and actual node boundaries are determined by the partition nodes position in the XML document. Towards that end, it can be advantageous to shallow parse the document from the start for each node.

One or more embodiments of the invention can also include shallow parsing XML for partitioning, as well as partitioning an XML document on multiple processors such that the size of each partition is decided by a partitioning algorithm using the input XML document in an online fashion.

Figure 4:
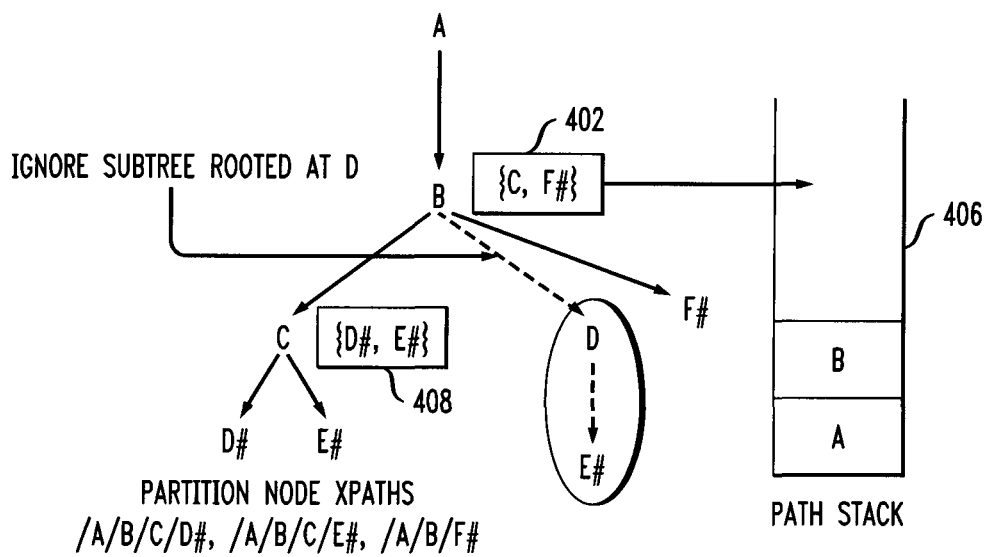
FIG. 4 is a diagram illustrating shallow parsing for multiple partition nodes, according to an embodiment of the present invention.

FIG. 4 is a diagram illustrating shallow parsing for multiple partition nodes, according to an embodiment of the present invention. The XML document in the figure has three partition nodes /A/B/C/D#, /A/B/C/E#, /A/B/F#. One or more embodiments of the invention require the maintenance of a set called as ValidExtension for each node that appears in the XPath of one or more partition nodes. The ValidExtension set for a node B would contain the set of all nodes that appear after B in any of the partition node XPaths. Thus, the ValidExtension for B will be the set {C, F#} 402.

One or more embodiments of the invention also require the maintenance of a stack 406 called PathStack. Whenever one encounters a node that is part of at least one partition node's XPath, that node is pushed on to the PathStack. If the node B is at the top of PathStack then the shallow parsing is done by looking for (i) the closure of the node B or (ii) looking for the nodes that are in the ValidExtension set of B. XPEDIA ignores all the other nodes which helps it to avoid the high cost associated with a full parse. If there is a closure of the node which is at the top of the stack, one can pop it from the PathStack. To illustrate the algorithm further, consider a scenario at the node B given in FIG. 4. In this case, one can either push a C node or an F #node on the stack. All other nodes are ignored since they are not part of any XPath leading to the partition nodes.

For set 408, while shallow parsing, at each node, one or more embodiments of the invention examine the current admissible node on the stack. By way of example, there are two paths that are being extended from node C, that is, /A/B/C/D and A/B/C/E. As such, when one is at node C, one is interested in only node D and node E. The remaining nodes are ignored so one can keep a set (for example, in FIG. 4, the set contains two nodes D, E). If any node that is encountered matched a node in this set, that particular node is pushed on the stack (component 406 in FIG. 4) and this process continues until the partition node is found.

As such, further in FIG. 4, for example, at node B, one can be interested only in node C and F (since only these two nodes are lying on the partition node XPaths that one is interested in). If one finds F, the process is done (the partition node for XPath A/B/F has been found). If one finds node C, one then looks at the set associated with node C and only parse nodes that are in this set (in FIG. 4, for example, that would include D and E).

Whenever a partitioning node is found, if the required partition in the XML document has not been reached, one can ignore the XML sub-tree rooted at the partition node. If on the other hand, the required partition has been reached, one or more embodiments of the invention can output the sub-tree rooted at the partition node.

Additionally, as detailed herein, for each partitioning node, there is an XPath associated therewith. In XML tree, at each node towards the path to one or more partition nodes, one can maintain a set of nodes. This set contains the tag of all of the eligible nodes that extend the path towards one or more partition nodes. One can also maintain a stack called PathStack. Whenever a node that is part of at least one partition node's XPath is found, that node is pushed on to stack. At any time, only a node that is part of set associated with a top of stack node can be pushed on the stack since only these nodes will lie in the XPath of one or more partition node.

In the case of a multiple partition node, if prefix of XPath of certain partition nodes are common, there will be multiple nodes in set associated with such nodes. Hence, one can push an element tag of a node on the stack, iff it is part of XPath to partitioning node(s).

Whenever a partitioning node is found, all of the elements in a stack would constitute the Xpath for that node and, hence, one can uniquely identify the partitioning node. If there is a node with the same tag anywhere else in the XML schema, the Xpath to that node would be different and hence it would not be pushed on to the stack. Whenever the close element event is received in XML document stream for any element tag pushed onto the stack, one can pop that element out. Whenever one shallow parses the document, the XML sub-tree rooted at partition node can be ignored; otherwise that sub-tree is subjected to corresponding set of operators for transformation.

One or more embodiments of the invention additionally include parallel schema validation. Schema validation of XML documents is a computationally intensive task that takes a large amount of time to execute. The techniques detailed herein support XML schema validation in parallel on multiple machines/processors, which helps to significantly reduce the time required for the process. At a high level, one or more embodiments of the invention achieve parallel schema validation by partitioning the XML document as mentioned earlier and providing a modified XML schema file to each parallel processor. Each parallel processor then validates its partition using the provided XML schema file. If each processor confirms that its partition is compliant with the input XML schema file, then the techniques described herein can guarantee that the un-partitioned XML document conforms to the original XML schema. In order to provide this guarantee, one or more embodiments of the invention classify the input XML schema as either being partition safe or partition unsafe.

An XML schema is said to be partition unsafe if it uses any of the following XML schema indicators on the partition nodes: MinOccurs, MaxOccurs, All, Sequence and Choice. The problem with these indicators is that it is not possible for a single partition to check these indicators. Consider the example schema given in FIG. 3, for example. Let there be a maxOccurs constraint on the /Company/Country node and let it be the partition node. If one uses the chunking based partitioning scheme, then each partition will get some sub-set of the sub-trees rooted at /Company/Country. Hence, one cannot check the maxOccurs constraint using the data available within a single partition. The same holds true even in the case when a round robin partitioning scheme is used. If, on the other hand, there was no such schema indicator on the partition node, then notice that each partition will conform to the input XML schema. Hence, such schema which do not have schema indicators on the partition node are said to be partition safe and the original XML schema file can be provided to each of the processors.

In case the schema is partition unsafe, then one or more embodiments of the invention can include using a special technique for schema validation. As mentioned earlier, the problem with unsafe schemas was that it was not possible to check the schema using the data available within a single partition. However, notice that the $N^{th}$ (that is, the last) processor generates its partition by shallow parsing the entire XML document and producing the last portion of the XML document as its partition. Recall that the shallow parsing involves the iteration over the sub-trees rooted at the partition node. As such, the schema validation for the schema indicators defined on the partition node can be easily done while doing the shallow parsing.

For the example mentioned earlier in connection with FIG. 3, if there was a "maxOccurs=10000" constraint on the /Company/Country node, then the shallow parser on the last processor can easily keep track of the number of Country nodes that it has encountered and signal an error if the number crosses 10000. Even in the case of round robin based partitioning scheme, the last processor does a shallow parsing of the entire XML file and hence can easily check the schema indicator constraints. Thus, the schema indicator is checked during the shallow parsing on the $N^{th}$ processor and these schema indicators are removed from the schema file that is provided as input to each of the processors. As such, each processor checks the constraints present in the schema file except the schema indicators defined on the partition node which are checked by the shallow parser. Thus, one or more embodiments of the invention can include handling both partition safe and partition unsafe schemas, which help to significantly reduce the time required for schema validation.

As detailed herein, in one or more embodiments of the invention, shallow parsing is performed on one node, while shredding/schema validation is performed on multiple nodes, where shallow parsing sends seek pointers to each of the shredding nodes, and each node receives one contiguous portion of XML file for shredding.

One or more embodiments of the invention can also include performing shallow parsing on one node, while performing shredding/schema validation on multiple nodes, where shallow parsing sends seek pointers to each of the shredding nodes and each node receives multiple portions of the XML file for shredding (in round robin manner).

Further, in one or more embodiments of the invention, each node performs shallow parsing and shredding/schema validation, where the shallow parser extends the InputStream, shredding/schema validation of XML document is done in a single pass, and each node receives contiguous part of the XML document.

Additionally, in one or more embodiments of the invention, each node performs shallow parsing and shredding/schema validation, where the shallow parser extends the InputStream, shredding/schema validation of XML document is done in a single pass, and each node receives multiple parts of the XML document (in round robin manner).

Figure 5:
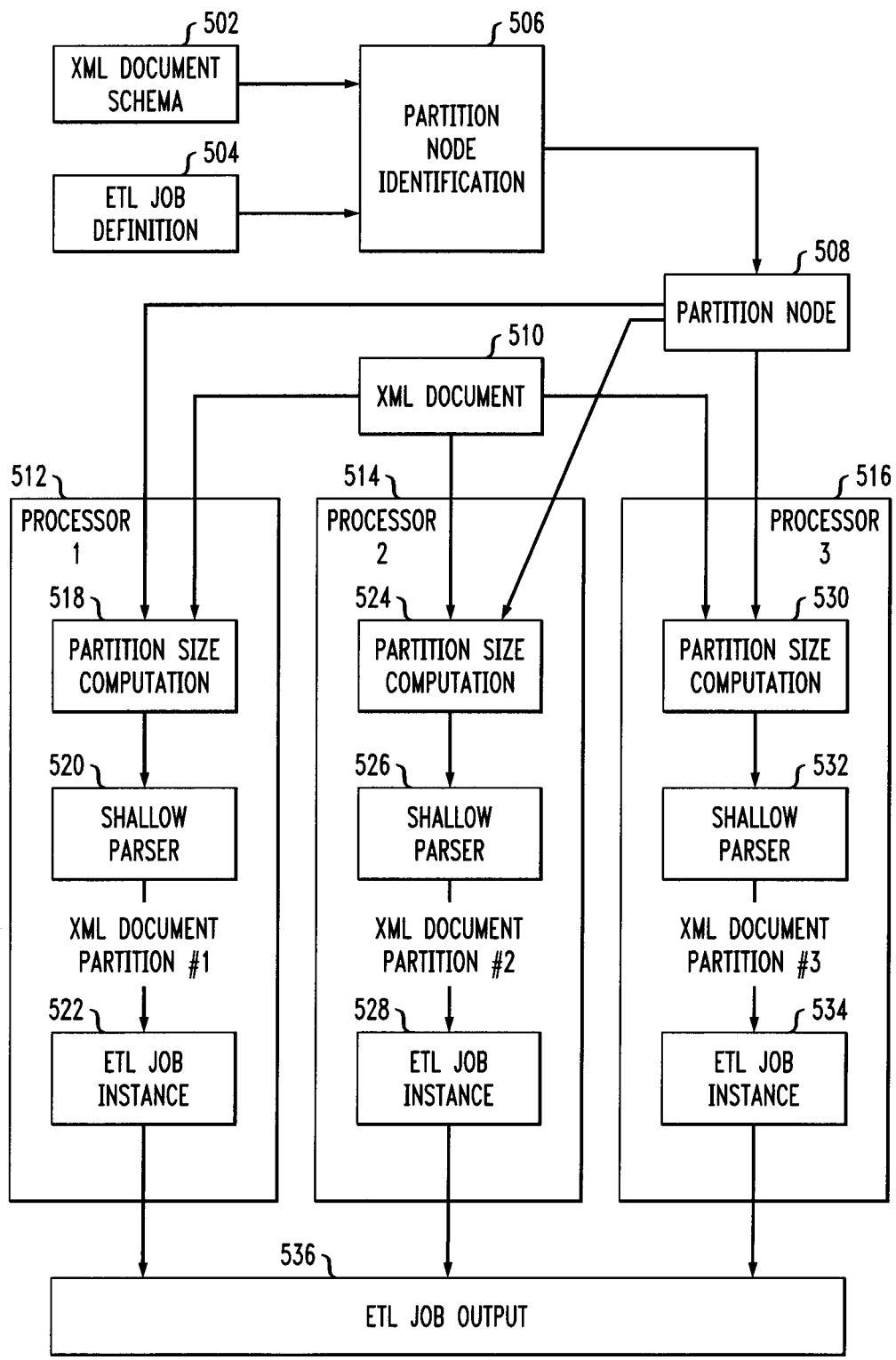
FIG. 5 is a block diagram illustrating an exemplary embodiment, according to an aspect of the invention.

FIG. 5 is a block diagram illustrating an exemplary embodiment, according to an aspect of the invention. The ETL job definition 504 along with the XML file schema 502 is input to the partition node identification module 506. This module is responsible for analyzing the ETL job definition and suggesting the partition node. Alternatively, the partition node can also be provided as input by the user. The XML document 510 and the to partition node 508 is further input to each of the parallel processors/machines (for example, components 512, 514 and 516) on which the ETL job is to be executed in parallel.

As such, a partition size computation module (for example, components 518, 524, 530) is responsible for generating the size of each partition using the load balancing procedure described herein. This module generates the start and end position of the partition in the XML document. Also, the module running on a processor generates the partition start and end for that processor. Thus, each of the modules running on the three processors will generate a different start and end such that it will generate three different parts of the same XML document.

Additionally, a shallow parser module (for example, components 520, 526 and 532) reads the XML document and does a shallow parsing of the XML document using the partition node. It performs a shallow parsing until it reaches the start of its partition. Then the module sends the XML document to the instances of the ETL job running on that processor. The ETL job instance module (for example, components 522, 528 and 534) processes the part of the XML document (partition) sent by the shallow parser and generates the output 536. By way of example, FIG. 5 depicts an instance where the ETL job is run in parallel on three processors. Those skilled in the art will appreciate that the number of processors could vary and that FIG. 5 depicts three processors simply for purposes of illustration.

Figure 6:
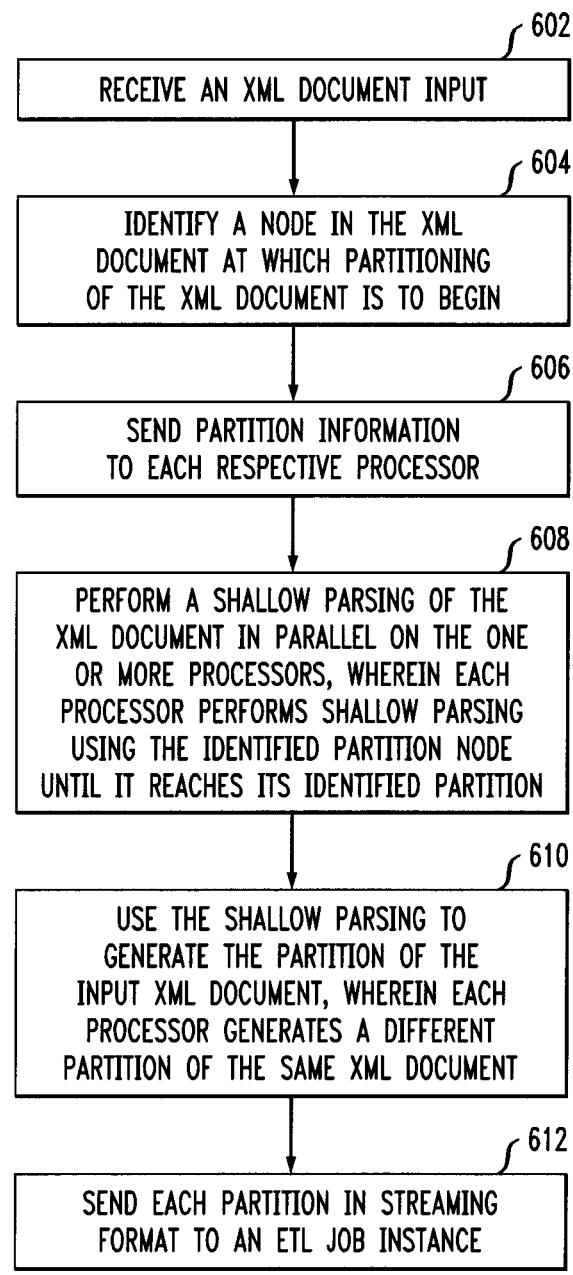
FIG. 6 is a flow diagram illustrating techniques for running an Extract Transform Load (ETL) job in parallel on one or more processors wherein the ETL job comprises use of an extensible markup language (XML) document, according to an embodiment of the invention.

FIG. 6 is a flow diagram illustrating techniques for running an Extract Transform Load (ETL) job in parallel on one or more processors wherein the ETL job comprises use of an extensible markup language (XML) document, according to an embodiment of the present invention. Step 602 includes receiving an XML document input. In one or more embodiments of the invention, input can be received (for example, from a user) on the approximate size of each partition, and each partition can also be defined based on the size of the XML document and the number of available machines/nodes. Further, as detailed herein, each partition contains the complete sub-tree rooted at the node suggested by the user (even if it spills over to the segment)).

Step 604 includes identifying a node in the XML document at which partitioning of the XML document is to begin. Step 606 includes sending partition information to each respective processor.

Step 608 includes performing a shallow parsing of the XML document in parallel on the one or more processors, wherein each processor performs shallow parsing using the identified partition node until it reaches its identified partition. In one or more embodiments of the invention, the shallow parsing can be performed on a single processor. Also, the shallow parsing can send start and end points of each partition to the one or more processors, wherein each processor seeks to the start of its partition and sends its partition to its instance of an ETL job definition. Additionally, in one or more embodiments of the invention, the shallow parsing includes parsing of only nodes that appear in an XML path language (XPATH) of the partition node and ignoring nodes not in the partition node XPATH.

Step 610 includes using the shallow parsing to generate the partition of the input XML document, wherein each processor generates a different partition of the same XML document. Step 612 includes sending each partition in streaming format to an ETL job instance. Sending each partition in streaming format can include, for example, adding a root node to the partition.

The techniques depicted in FIG. 6 can also include identifying a size of each partition to be created within the XML document, wherein each partition is created on a different processor. Additionally, one or more embodiments of the invention include running the ETL job and shredding the XML document in parallel on multiple nodes, wherein parallel shredding includes using horizontal partitioning to shred different parts of the XML document in parallel on different nodes.

The techniques depicted in FIG. 6 can also include performing schema validation of the XML document in parallel on multiple nodes, wherein performing schema validation of the XML document includes using shallow parsing to generate partitions of the XML document to each be processed on a different node. Performing schema validation can also include ensuring that each processor does a single pass of the XML document (for example, the single pass can be a faster shallow parse as opposed to a full parse).

Additionally, in performing schema validation, if an XML schema file contains an XML schema indicator such as a minoccurs XML schema indicator and/or a maxoccurs XML schema indicator defined on a node on which partitioning is to be done, one or more embodiments of the invention can include removing the indicators from the schema file, checking validity of the indicators during the shallow parsing on a node processing a last segment of the XML document, and generating an error if the validation fails during shallow parsing.

Further, in performing schema validation, if an XML schema file contains an XML schema indicator such as an all XML schema indicator, sequence XML schema indicator, and choice XML schema indicator defined on the node on which partitioning is to be done, one or more embodiments of the invention can include sending each node taking part in the indicators but not in a repetition element path, only to the first node, and sending each remaining node a first value of output nodes that are not in the repetition path, and a schema file that does not have the XML schema indicators.

The techniques depicted in FIG. 6 can additionally include generating output in the form of a modified extract, transform, and load (ETL) job definition that can run on multiple processors in parallel, as well as generating output in the form of a modified set of XML path languages (XPaths) mapping to a set of output relational attributes.

One or more embodiments of the invention can also include passing the XML document beyond the identified partition size as a separate XML document in streaming format, as well as distributing XML partitions evenly in a single pass manner (that is, without a need to parse the XML document first to understand its statistical properties for even partitioning). Further, the techniques depicted in FIG. 6 can include partitioning the XML document for load balancing by partitioning the XML document to keep an overall load on all parallel nodes evenly distributed to achieve maximum performance gains.

Additionally, if a sub-tree rooted at the identified node does not contain all output nodes, one or more embodiments of the invention can include adding each missing output node to the partition and modifying each XML path language (XPath) provided to the ETL job definition. Further, if there are multiple output nodes in the XML document that are not part of a repetition path, one or more embodiments of the invention can include keeping only a first occurrence of such nodes in the XML document.

The techniques depicted in FIG. 6 can also, as described herein, include providing a system, wherein the system includes distinct software modules, each of the distinct software modules being embodied on a tangible computer-readable recordable storage medium. The distinct software modules can include, for example, a partition node identification module, a partition size computation module, a shallow parser module and an ETL job instance module executing on a hardware processor.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
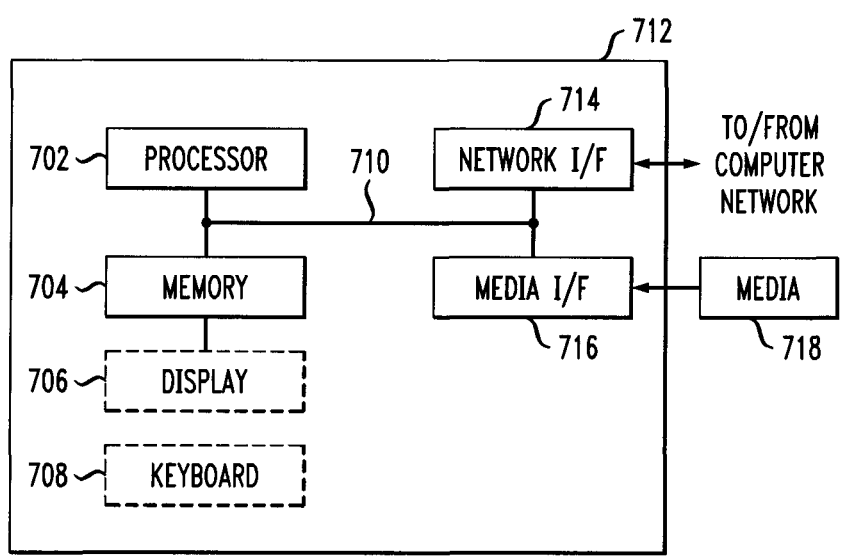
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 5. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling shredding of the document in parallel on multiple nodes as well as enabling schema validation of the XML document on multiple nodes.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for running an Extract Transform Load (ETL) job in parallel on multiple processors wherein the ETL job comprises use of an extensible markup language (XML) document, wherein the method comprises:

receiving an ETL job definition and an input XML document;

identifying a node in the input XML document at which partitioning of the input XML document is to begin based on the ETL job definition and the XML document;

identifying a size of each partition to be created within the input XML document, wherein each partition is created on a different processor;

sending partition information to each respective processor, wherein the partition information includes the node in the input XML document at which partitioning of the input XML document is to begin and the size parameter for each partition;

performing a shallow parsing of the input XML document in parallel on the multiple processors, wherein each processor performs shallow parsing using the identified partition node until it reaches its identified partition, and wherein said performing the shallow parsing comprises:
    partitioning the input XML document in accordance with the portioning information; and
    performing a schema validation for each of one or more partition nodes corresponding to the partitioned input XML document;
using the shallow parsing to generate the partition of the input XML document on each processor, wherein each processor independently generates a different partition of the input XML document without dependence on any part of the input XML document that is not part of the partition associated with that processor;
sending each partition in streaming format to an ETL job instance; and
running each ETL job instance, wherein said running each ETL job instance comprises shredding the XML document in parallel on multiple nodes, and wherein said shredding comprises using horizontal partitioning to relationalize different partitions of the input XML document in parallel on different nodes.

2. The method of claim 1, wherein the shallow parsing is performed on a single processor.

3. The method of claim 2, wherein the shallow parsing sends start and end points of each partition to the one or more processors, wherein each processor seeks to the start of its partition and sends its partition to its instance of an ETL job definition.

4. The method of claim 1, wherein the shallow parsing comprises parsing of only nodes that appear in an XML path language (XPATH) of the partition node and ignoring nodes not in the partition node XPATH.

5. The method of claim 1, further comprising ensuring that each processor performs a single pass of the XML document.

6. The method of claim 1, further comprising, if an XML schema file contains at least one of a minoccurs XML schema indicator and a maxoccurs XML schema indicator defined on a node on which partitioning is to be done:
    removing the one or more indicators from the schema file;
    checking validity of the indicators during the shallow parsing on a node processing a last segment of the XML document; and
    generating an error if the validation fails during shallow parsing.

7. The method of 1, further comprising, if an XML schema file contains at least one of an all XML schema indicator, sequence XML schema indicator, and choice XML schema indicator defined on the node on which partitioning is to be done:
    sending each node taking part in the one or more indicators but not in a repetition element path, only to a first node; and
    sending each remaining node a first value of one or more output nodes that are not in the repetition path, and a schema file that does not have the XML schema indicators.

8. The method of claim 1, further comprising generating output in the form of a modified extract, transform, and load (ETL) job definition that can run on multiple processors in parallel.

9. The method of claim 1, wherein sending each partition in streaming format comprises adding a root node to the partition.

10. The method of claim 1, further comprising passing the XML document beyond the identified partition size as a separate XML document in streaming format.

11. The method of claim 1, further comprising partitioning the XML document for load balancing, comprising partitioning the XML document to keep an overall load on all parallel processors evenly distributed to achieve maximum performance gains.

12. The method of claim 1, further comprising distributing XML partitions evenly in a single pass manner.

13. The method of claim 1, further comprising, if a sub-tree rooted at the identified node does not contain all output nodes, adding each missing output node to the partition and modifying each XML path language (XPath) provided to the ETL job instance.

14. The method of claim 1, further comprising, if there are multiple output nodes in the XML document that are not part of a repetition path, keeping only a first occurrence of such nodes in the XML document.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise a partition node identification module, a partition size computation module, a shallow parser module and an ETL job instance module executing on a hardware processor.

16. A computer program product comprising a tangible non-transitory computer readable recordable storage medium including computer useable program code for running an Extract Transform Load (ETL) job in parallel on multiple processors wherein the ETL job comprises use of an extensible markup language (XML) document, the computer program product including:
    computer useable program code for receiving an ETL job definition and an input XML document;
    computer useable program code for identifying a node in the input XML document at which partitioning of the input XML document is to begin based on the ETL job definition and the XML document;
    computer useable program code for identifying a size of each partition to be created within the input XML document, wherein each partition is created on a different processor;
    computer useable program code for sending partition information to each respective processor, wherein the partition information includes the node in the input XML document at which partitioning of the input XML document is to begin and the size parameter for each partition;
    computer useable program code for performing a shallow parsing of the input XML document in parallel on the multiple processors, wherein each processor performs shallow parsing using the identified partition node until it reaches its identified partition, and wherein said performing the shallow parsing comprises:
        partitioning the input XML document in accordance with the portioning information; and
        performing a schema validation for each of one or more partition nodes corresponding to the partitioned input XML document;
    computer useable program code for using the shallow parsing to generate the partition of the input XML document on each processor, wherein each processor independently generates a different partition of the input XML document without dependence on any part of the input XML document that is not part of the partition associated with that processor;

computer useable program code for sending each partition in streaming format to an ETL job instance; and computer useable program code for running each ETL job instance, wherein said running each ETL job instance comprises shredding the XML document in parallel on multiple nodes, and wherein said shredding comprises using horizontal partitioning to relationalize different partitions of the input XML document in parallel on different nodes.

17. A system for running an Extract Transform Load (ETL) job in parallel on multiple processors wherein the ETL job comprises use of an extensible markup language (XML) document, comprising:

a memory; and at least one processor coupled to the memory and operative to:

receive an ETL job definition and an input XML document;

identify a node in the input XML document at which partitioning of the input XML document is to begin based on the ETL job definition and the XML document;

identify a size of each partition to be created within the input XML document, wherein each partition is created on a different processor;

send partition information to each respective processor, wherein the partition information includes the node in the input XML document at which partitioning of the input XML document is to begin and the size parameter for each partition;

perform a shallow parsing of the input XML document in parallel on the multiple processors, wherein each processor performs shallow parsing using the identified partition node until it reaches its identified partition, and wherein said performing the shallow parsing comprises:

partitioning the input XML document in accordance with the portioning information; and performing a schema validation for each of one or more partition nodes corresponding to the partitioned input XML document;

use the shallow parsing to generate the partition of the input XML document on each processor, wherein each processor independently generates a different partition of the input XML document without dependence on any part of the input XML document that is not part of the partition associated with that processor;

send each partition in streaming format to an ETL job instance; and run each ETL job instance, wherein said running each ETL job instance comprises shredding the XML document in parallel on multiple nodes, and wherein said shredding comprises using horizontal partitioning to relationalize different partitions of the input XML document in parallel on different nodes.

* * * * *